(12) United States Patent
Turtinen et al.

(10) Patent No.: US 9,414,421 B2
(45) Date of Patent: Aug. 9, 2016

(54) DIRECT COMMUNICATION AMONG DEVICES

(71) Applicant: Broadcom Corporation, Irvine, CA (US)

(72) Inventors: Samuli Turtinen, Ii (FI); Sami-Jukka Hakola, Kempele (FI); Timo Kalevi Koskela, Oulu (FI); Jussi Kustaa Ojala, Helsinki (FI); Kaisu Maria Iisakkila, Espoo (FI); Jari Jakko Isokangas, Tampere (FI)

(73) Assignee: BROADCOM CORPORATION, Irvine, CA (US)

( * ) Notice: Subject to any disclaimer, the term of this patent is extended or adjusted under 35 U.S.C. 154(b) by 254 days.

(21) Appl. No.: 14/041,143

(22) Filed: Sep. 30, 2013

(65) Prior Publication Data

US 2014/0092868 A1    Apr. 3, 2014

(30) Foreign Application Priority Data

Oct. 2, 2012 (GB) .................................. 1217630.1

(51) Int. Cl.
  *H04L 12/28* (2006.01)
  *H04W 76/02* (2009.01)
  *H04W 12/06* (2009.01)

(52) U.S. Cl.
  CPC ............ *H04W 76/023* (2013.01); *H04W 12/06* (2013.01)

(58) Field of Classification Search
  CPC ........................... H04W 76/023; H04W 12/06
  See application file for complete search history.

(56) References Cited

U.S. PATENT DOCUMENTS

| | | | |
|---|---|---|---|
| 8,594,632 B1 * | 11/2013 | Azizi et al. | 455/411 |
| 2008/0186901 A1 | 8/2008 | Itagaki et al. | |
| 2010/0260101 A1 | 10/2010 | Tsirtsis et al. | |
| 2010/0317315 A1 * | 12/2010 | Burbidge et al. | 455/404.1 |
| 2011/0082940 A1 | 4/2011 | Montemurro et al. | |
| 2011/0145421 A1 | 6/2011 | Yao et al. | |
| 2011/0170517 A1 * | 7/2011 | Bakker et al. | 370/331 |
| 2012/0230289 A1 * | 9/2012 | Olsson et al. | 370/329 |
| 2012/0252355 A1 * | 10/2012 | Huang et al. | 455/7 |
| 2013/0252618 A1 * | 9/2013 | Jha | 455/438 |

(Continued)

FOREIGN PATENT DOCUMENTS

| | | |
|---|---|---|
| EP | 1921873 A1 | 5/2008 |
| WO | 2007/044597 | 4/2007 |

(Continued)

OTHER PUBLICATIONS

3GPP TR 22.803 v1.0.0 (Aug. 2012); 3rd Generation Partnership Project; Technical Specification Group SA; Feasibility Study for Proximity Services (Release 12); Aug. 2012 (33 pages).

*Primary Examiner* — Robert Wilson
(74) *Attorney, Agent, or Firm* — Oblon, McClelland, Maier & Neustadt, L.L.P.

(57) ABSTRACT

Method, operation of a method, and a result of execution of computer program instructions embodied on a non-transitory computer readable memory in a mobility management entity which determines whether a source and destination address of certain Internet protocol data flow are within a specific network in an evolved packet system for evaluating and controlling potential opportunities for device to device communication among two or more proximately located user equipment. In response to determining that the target serving gateway is the source gateway, identification information of the source user equipment is sent to a target serving gateway.

16 Claims, 3 Drawing Sheets

(56) References Cited

U.S. PATENT DOCUMENTS

| | | |
|---|---|---|
| 2013/0315123 A1* | 11/2013 | Koskinen et al. ............. 370/312 |
| 2014/0003373 A1* | 1/2014 | Hakola et al. ................. 370/329 |
| 2014/0016586 A1* | 1/2014 | Khan et al. .................... 370/329 |
| 2014/0092868 A1* | 4/2014 | Turtinen et al. ............... 370/331 |
| 2014/0220936 A1* | 8/2014 | Turtinen et al. ............... 455/411 |

FOREIGN PATENT DOCUMENTS

| | | |
|---|---|---|
| WO | 2010/007498 | 1/2010 |
| WO | 2011/039718 | 4/2011 |
| WO | 2011/161560 | 12/2011 |
| WO | 2012/088470 | 6/2012 |

\* cited by examiner

DIRECT COMMUNICATION AMONG DEVICES

TECHNICAL FIELD

This invention relates generally to wireless communication systems, methods, devices and computer programs, and, more specifically, relates to determining whether a source and destination address of certain Internet protocol data flow are within a specific network in an evolved packet system for evaluating and controlling potential opportunities for device to device communication among two or more proximately located user equipment.

BACKGROUND

Social-technical trends have resulted in a proliferation of over-the-top (OTT) applications and services such as Facebook Places, Google Latitude and Shop Kick. These proximity-based applications and services are based upon an awareness that two or more user equipment (or users) are in close proximity to one another. These applications and services typically rely upon "high-level software," employ global positioning system (GPS) technologies and networks for determining the position of each user equipment (UE) while accessing a wireless local area network (WLAN), an evolved universal telecommunications radio access network or a legacy radio access network which supply the "data pipes" for the application or service. In such a high-level software scheme, there is no network supervision of these applications and services. As such, OTT applications and services represent unregulated network traffic which utilize bandwidth, and pose security risks while offering no economic advantage from the mobile network operator's perspective.

Device-to-device (D2D) communications are contemplated as an underlay of an advanced cellular network, such as the long term evolution-advanced (LTE-A) and LTE-beyond (LTE-B) networks, as specified in the 3rd Generation Partnership Project (3GPP). In D2D communications, two or more user equipment (in close proximity) may communicate directly instead of through an evolved Node B (eNB) and evolved packet core network to offload network traffic, such as video streaming, online gaming, media downloading, and peer-to-peer (P2P) file sharing. Unlike competing technologies like Bluetooth and WiFi, D2D communication promises to provide network operators the ability to coordinate communications in licensed and unlicensed spectrum in each cell to avoid interference among devices. However, an LTE platform does not currently include functionality which would allow network supervision of over the air device discovery to intercept the above described growing demand for proximity-based packet switched applications and services.

There is a need for network-based identifying, evaluating and controlling potential opportunities for device to device communication among two or more proximately located user equipment coupled to an E-UTRAN system and security architecture. Such network-based control would allow UE access to proximity-based packet switched applications and services while at the same time allowing cellular network operators the ability to retain control of each UE's behavior; for example, which UE can emit discovery signals, when and where, what information each UE carries and what the UEs should do once they discover each other.

The following abbreviations that may be found in the specification and/or the drawing figures are defined as follows:

3GPP 3rd Generation Partnership Project
BS base station
D2D device-to-device
DDN downlink data notification
ECGI E-UTRAN cell global identifier
ECM EPS connection management
EPS evolved packet system
eNB evolved Node B
E-UTRAN evolved universal terrestrial radio access network
ID identification
IP Internet protocol
LTE-A Long Term Evolution-Advanced
LTE-B Long Term Evolution-Beyond
M2M machine-to-machine
ME mobile equipment
MME mobility management entity
MTC machine type communication
NAS non-access stratum
P-GW packet data network gateway
RAN radio access network
RRC radio resource control
SA service aspects
S-GW serving gateway
TA tracking area
TAU tracking area update
UE user equipment

SUMMARY

In accordance with a first aspect of the present invention, there is provided a method for use in device to device communication among two or more user equipment, the method comprising:
determining if a source and destination address of one or more Internet protocol data flows are within a specific network in an evolved packet system; and
sending identification information of a source user equipment to a target serving gateway.

In accordance with a second aspect of the present invention, there is provided an apparatus for use in device to device communication among two or more user equipment, the apparatus comprising a processing system that comprises at least one processor and at least one memory storing at least one computer program. In this second aspect of the invention the processing system is configured to cause the apparatus to at least:
determine if a source and destination address of one or more Internet protocol data flows are within a specific network in an evolved packet system; and
send identification information of a source user equipment to a target serving gateway.

In accordance with a third aspect of the present invention, there is provided a computer program comprising a set of instructions, which, when executed by a computerised device, causes the computerised device to carry out a method for use in device to device communication among two or more user equipment, the method comprising:
determining if a source and destination address of one or more Internet protocol data flows are within a specific network in an evolved packet system; and
sending identification information of a source user equipment to a target serving gateway.

In accordance with a fourth aspect of the present invention, there is provided a method for use in device to device communication among two or more user equipment, the method comprising:

receiving information pertaining to a source user equipment from at least one packet data network gateway; and in response to receiving information pertaining to the source user equipment from the at least one packet data network gateway, sending identification information of a target user equipment and identification information of the source user equipment to a target mobility management entity.

In accordance with a fifth aspect of the present invention, there is provided apparatus for use in device to device communication among two or more user equipment, the apparatus comprising a processing system that comprises at least one processor and at least one memory storing at least one computer program. In this fifth aspect of the invention the processing system is configured to cause the apparatus to at least:

receive information pertaining to a source user equipment from at least one packet data network gateway; and in response to receiving information pertaining to the source user equipment from the at least one packet data network gateway, send identification information of a target user equipment and identification information of the source user equipment to a target mobility management entity.

In accordance with a sixth aspect of the present invention, there is provided a computer program comprising a set of instructions, which, when executed by a computerised device, causes the computerised device to carry out a method for use in device to device communication among two or more user equipment, the method comprising:

receiving information pertaining to a source user equipment from at least one packet data network gateway; and in response to receiving information pertaining to the source user equipment from the at least one packet data network gateway, sending an identification information of a target user equipment and identification information of the source user equipment to a target mobility management entity.

Embodiments comprise means for determining if a source and destination address of one or more Internet protocol data flows are within a specific network in an evolved packet system and means for sending identification information of a source user equipment to the target serving gateway.

Embodiments comprise means for receiving information pertaining to a source user equipment from at least one packet data network gateway, and means for sending an identification of a target user equipment and identification information of the source user equipment to a target mobility management entity in response to receiving information pertaining to the source user equipment from the at least one packet data network gateway.

Embodiments comprise a computer program product comprising a non-transitory computer-readable storage medium having computer readable instructions stored thereon, the computer readable instructions being executable by a computerized device to cause the computerized device to perform a method according to the first or fourth aspects of the present invention.

Further features and advantages of the invention will become apparent from the following description of preferred embodiments of the invention, given by way of example only, which is made with reference to the accompanying drawings.

DETAILED DESCRIPTION

Embodiments of this invention provide apparatuses, methods, and computer programs that to determining whether a source and destination address of certain Internet protocol data flow are within a specific network in an evolved universal telecommunications access network for evaluating and controlling potential opportunities for device to device (D2D) communication among (or 'between') two or more proximately located user equipment (UE). Throughout this disclosure the terms "device" and "user equipment" are used interchangeably. In one embodiment of the invention a packet data network gateway determines if a source and destination address of one or more Internet protocol data flows are within a specific network in an evolved packet system, and sends identification information of a source user equipment to a target serving gateway. In another embodiment of the invention a serving gateway receives information pertaining to a source user equipment from at least one packet data network gateway, and in response to receiving information pertaining to the source user equipment from the at least one packet data network gateway, sends an identification of the target user equipment and identification information of the source user equipment to a target mobility management entity.

In one non-limiting example, a target device's identification is the target UE's international mobile subscriber identifier (IMSI), mobile station integrated services digital network (MSISDN) ID, mobile equipment (ME) identifier, and the like. Embodiments of the present invention allow control of a UE's access to one or more proximity-based packet switched applications or services by a core network.

Prior to describing in detail the apparatuses, methods, and computer programs suitable for carrying out the above mentioned embodiments, a description of the relevant long term evolved (LTE) system, including core network entities and related functionalities, will be provided to provide clarification of embodiments of the present invention.

In long term evolved (LTE) systems, each UE is required upon powering on to register with a public land mobile network (PLMN) by way of a radio access network (RAN) employing an Initial Attach procedure to access an evolved universal telecommunications radio access network (E-UTRAN). LTE refers to radio access architecture as the access stratum (AS), which may include various radio access networks (RANs) such as a 4G access network, like E-UTRAN or legacy RANs, such as a 3G cellular network like a universal telecommunications radio access network (UTRAN), or a 2G cellular network like a global system for communication (GSM) Enhanced Data rates for GSM Evolution (EDGE) radio access network (GERAN).

Figure 1:
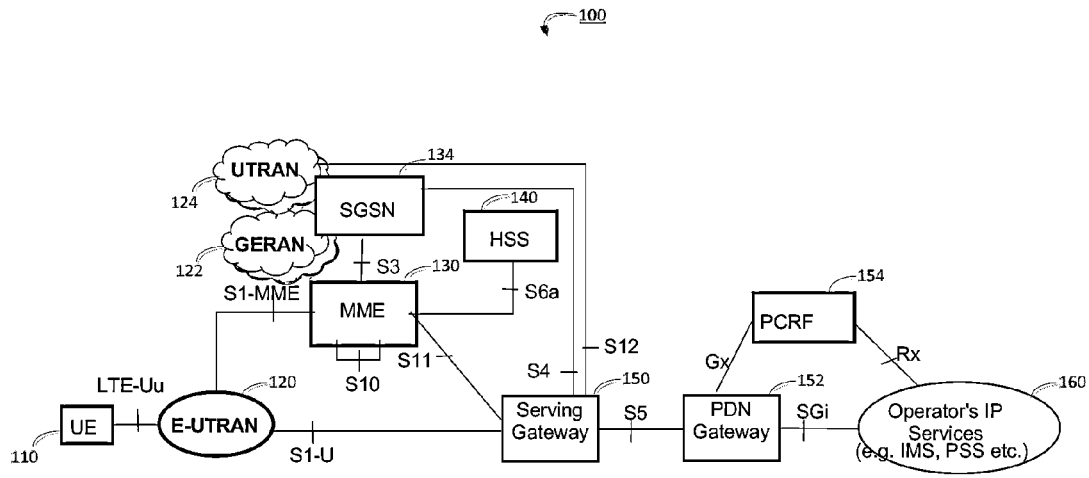
FIG. 1 reproduces FIG. 4.2.1-1 from 3GPP TS 23.23.401 (Version 11.2.0) which illustrates the non-roaming architecture for 3GPP access in accordance with the prior art.
Figure 4:
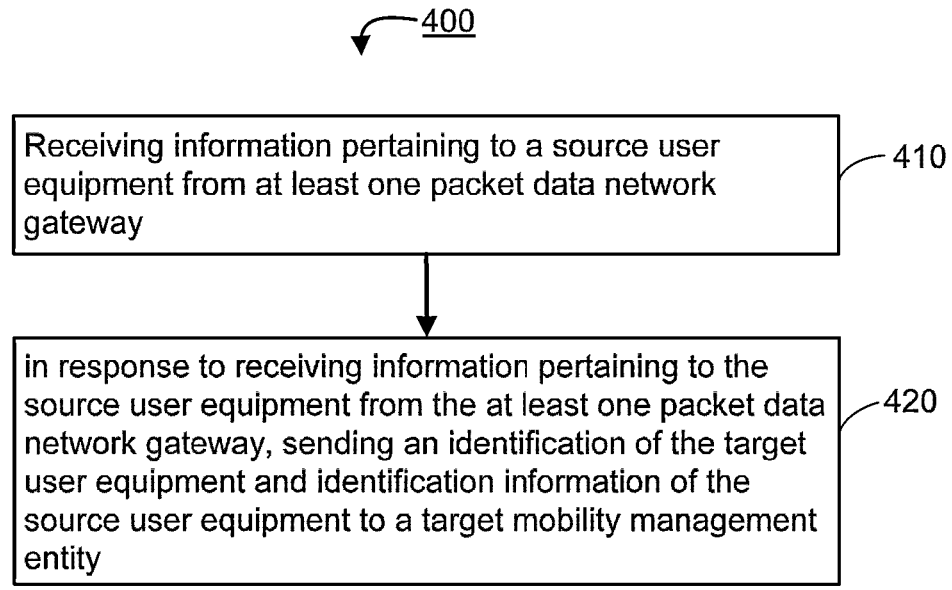
FIG. 4 is a logical flow diagram of the operation of methods and execution of computer program instructions tangibly embodied on a computer readable memory in serving gateway that identify, evaluate and control potential opportunities for device to device communication among two or more proximately located user equipment, in accordance with embodiments of the present invention.

FIG. 1 reproduces FIG. 4.2.1-1 from 3GPP TS 23.23.401 (Version 11.2.0) which illustrates the non-roaming architecture for 3GPP accesses 100 in accordance with the prior art. As shown in FIG. 1, UE 110 is coupled to E-UTRAN 120 via a LTE-Uu radio frequency (RF) interface for connectivity to an evolved Node B (not shown) in E-UTRAN 120. Although not shown in FIG. 1, UE 110 also has at least two other RF interfaces at its disposal, such as a Uu RF interface for connectivity between UE 110 and a Node B (not shown) and RNC (not shown) in a legacy 3G RAN (e.g., such as UTRAN 124), and a Um RF interface for connectivity between UE 110 and a base transceiver station (BTS) and a base station controller (BSC) in a legacy 2G RAN (e.g., such as GERAN 122).

Also shown in FIG. 1, various other non-access stratum (NAS) entities are shown such as a serving GPRS support node (SGSN) 134 and/or mobility management entity (MME) 130 which provide access to a core network (CN) for E-UTRAN 120, UTRAN 124 or GERAN 122. MME 130 actually may be one of many MMEs in a so-called MME pool (not shown). That is, in LTE multiple MMEs are provided for load balancing and redundancy. Each MME in the network is identified by a MME ID and a group code and one or more evolved Node Bs (eNBs) (not shown) can communicate with multiple MMEs in a pool. In FIG. 1, UE 110 can access the core network (CN) via UTRAN 124 by employing SGSN 134 together with a MME (by way of a S3 interface), thereby providing UE 110 with connectivity to the packet switched (PS) domain 160. Alternatively, UE 110 can access the CN employing GERAN 122 via SGSN 134 which is also adapted to provide connectivity to the PS domain for GERAN 122 via a Gb interface (not shown) and a S4 interface. A S1-MME interface and S1-U interface provide connectivity to the PS domain for E-UTRAN 120. Both E-UTRAN 120 and the legacy RANs access a packet data network gateway (P-GW) 152 by way of a serving gateway (S-GW) 150. As with the MMEs, multiple S-GWs and multiple P-GWs are provided in LTE and each is provided with identifying information. Again, to simplify this description, only one of each entity is shown. P-GW 152 is further adapted for employing common core network functions, such as the transfer of quality of service (QoS) policy and charging rules from a policy control and charging rule function (PCRF) 154 by way of the Gx reference point. Also, P-GW 152 allocates UE IP addresses, packet filtering, packet routing and forwarding and access to network operator's Internet protocol (IP) services 160, such as IP multimedia subsystem (IMS) and other packet switched services (PSS). A home subscriber server (HSS) 140 enables the transfer of subscription and authentication data via the S6a interface for authenticating and/authorizing user access to the evolved system which is obtained via a S6b interface from the authentication authorization accounting (AAA) server (not shown). The HSS 140 contains various subscription relevant data pertaining to users, such as international mobile subscriber identifier (IMSI), mobile station integrated services digital network (MSISDN), subscribed access point names (APN) and subscribed QoSe and so on.

As described above, in LTE the core network, or more precisely, the evolved packet core (EPC), provides each UE with IP connectivity to the P-GW, thereby allowing each device access to the Internet as well as running other IP services such as voice over IP (VOIP), IP multimedia subsystem (IMS), IP television, and IP location aware services, as well as other over-the-top (OTT) applications and services.

This non-access stratum (NAS) is a functional layer (protocol layer) between EPC and the UE. NAS procedures are responsible for: selection of a mobile network, attachment to the selected network, and updating the location of the UE.

Figure 2:
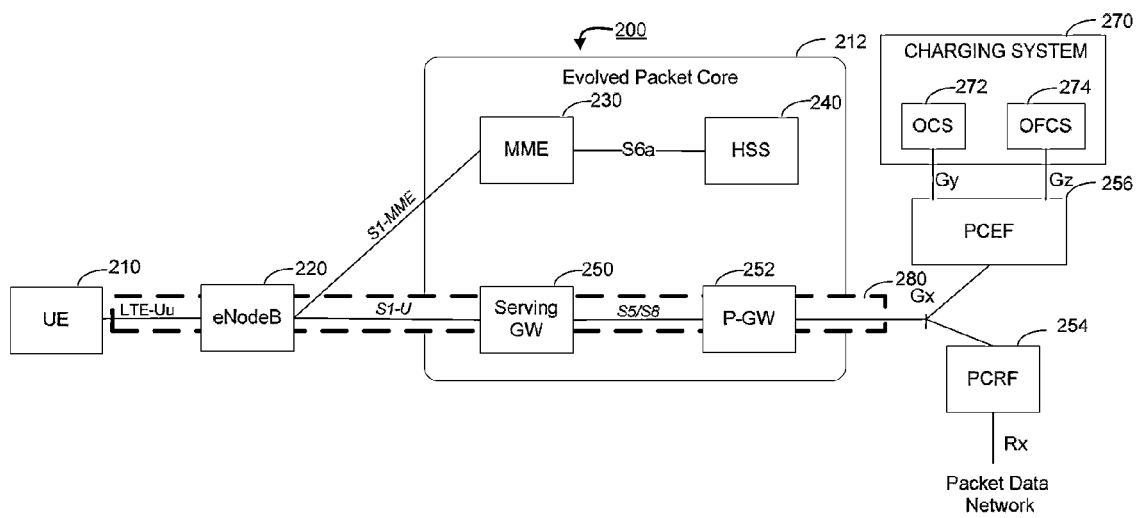
FIG. 2 illustrates some basic evolved packet core entities and non-access stratum functionalities including establishing a default evolved packet system bearer for handling packet switched services 200 suitable for carrying out embodiments of the present invention.

Referring now to FIG. 2, an illustration of some basic EPC entities and NAS functionalities including establishing a default EPS bearer for handling PS services 200 is shown. In FIG. 2, EPC 212 contains two functional elements in the user plane (i.e., the S-GW 250 and the P-GW 252) and one element in the control plane (i.e., MME 230). NAS signaling provides sub-layers for EPS mobility management (EMM) and EPS connection management (ECM) between the UE 210 and the MME 230 in the EPS 212. Logical connections in the control plane between UE 210 and MME 236 disregard eNB 220 (i.e., RF interface LTE Uu and S1-MME are logically combined). The S1-MME interface is provided for logical connectivity between UE 110 via access network (E-UTRAN 120) and the non-access stratum (NAS) via MME 130 as a function of the EPC procedures. During the Initial Attach procedure, UE 220 sends an Attach request to eNB 220 which forwards that request to MME 230 via the S1-MME interface. The MME 230 creates a UE context by selecting S-GW 250 and allocating an EPS bearer identity for the default bearer associated to the UE 220. MME 230 sends an information element (IE) to S-GW 250 which includes data obtained from HSS 240, such as a temporary IMSI, MSISDN, APN, a permanent E-UTRAN cell global identifier (ECGI), as well as a P GW address and IP address. Thereafter, in the Initial Attach procedure, S-GW 250 creates a new entry in its EPS bearer table and sends a create default bearer request message to P GW 252 indicated by the P GW address received in the previous step. P-GW 252 creates a new entry in its EPS bearer context table and generates a charging ID for UE 210. PCRF 254 and the policy control enforcement function (PCEF) 256 (although shown attached to the Gx reference point) are actually located within P-GW 252. That is, PCRF 254 and PCEF 256 are functions of P-GW and are shown in FIG. 2 externally to better illustrate the creation of a dedicated bearer 280 for handling various PS services. The PCEF 256 is further coupled to a charging system 270 which includes an online charging system (OCS) 272 and an offline charging system (OFCS) 274 by way of a Gy interface and Gz interface, respectively.

Mobility management and connection management in EPC is described by the EMM and ECM sub-layers in terms of numerous states in the UE and the MME. The key states are: EMM-DEREGISTERED/EMM-REGISTERED for EMM and ECM-IDLE ECM-CONNECTED in ECM. For example, UE 210 in the EMM-DEREGISTERED state is not reachable by MME 236. However, the UE context (S-TMSI) can be stored in the UE 210 and MME 230. As such, the UE 210 is in the EMM-DEREGISTERED state in MME 230. If UE 210 is in the EMM-REGISTERED state, its location is known, the accuracy of its tracking is assumed and it can have at least one active P connection (P-GW via interface S1-U and S5/S8). When UE 210 is in the ECM-IDLE state, NAS signaling does not occur between the EPS 212 and UE 210. If UE 210 enters both the EMM-REGISTERED and ECM-IDLE state, UE 210 performs the following functions: (i) it sends tracking area updates; (ii) it sends periodic tracking area updates (TAU); (iii) it sends service requests, and (iv) it responds to pages from MME 230.

Figure 3:
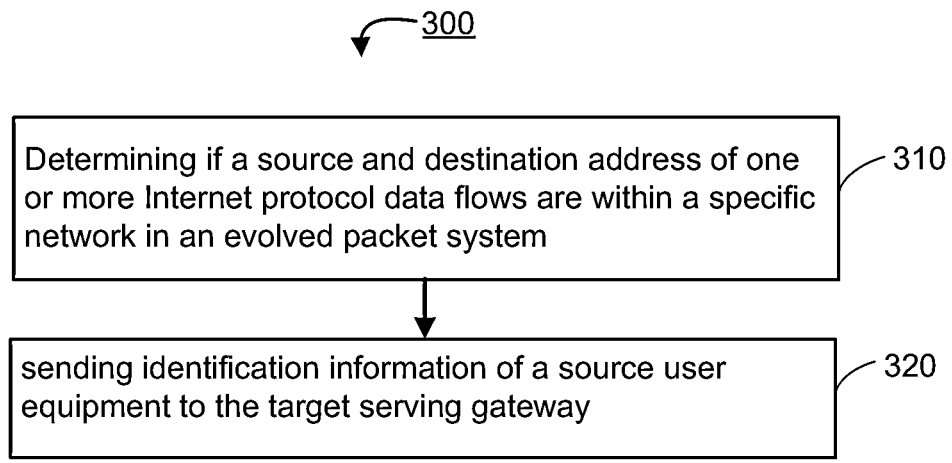
FIG. 3 shows a logical flow diagram of the operation of methods and execution of computer program instructions tangibly embodied on a computer readable memory in a packet data network gateway that identify, evaluate and control potential opportunities for device to device communication among two or more proximately located user equipment, in accordance with embodiments of the present invention.

Referring now to FIG. 3, a logical flow diagram of the operation of methods and execution of computer program instructions tangibly embodied on a computer readable memory in a packet data network gateway that identify, evaluate and control potential opportunities for D2D communication among two or more proximately located UE 300 is illustrated in accordance with the present invention. In a first step, the P-GW determines if a source and destination address of one or more Internet protocol data flows are within a specific network in an evolved packet system (310), and in a second step sends identification information of a source user equipment to a target serving gateway (320).

In an embodiment, the method and execution of computer instruction further includes the steps of, in response to determining that the Internet protocol data flows are within the specific network, determining if a source user equipment and a target user equipment are authenticated for device to device communication. In another embodiment, the method and execution of computer instruction further includes the steps of, determining if a target serving gateway is a source serving gateway. The target serving gateway is the serving gateway of the target UE and the source serving gateway is the serving gateway of the source UE. In addition, in certain scenarios referring to the "target serving gateway," may also mean the "source serving gateway" if they are the same entities. In yet another embodiment, the source user equipment identification information includes an international mobile subscriber identifier, a mobile station integrated services digital network identifier and/or a mobile equipment identifier. Another embodiment provides that in addition to the source user equipment identification information, an evolved packet system bearer identifier is sent which is associated with the corresponding Internet protocol data flows or an evolved universal telecommunications access network cell global identifier of the source device to the target serving gateway. Moreover, another embodiment provides that the target serving gateway sends at least one of the source user equipment identifiers to a target mobility management entity.

Referring now to FIG. 4, a logical flow diagram of the operation of methods and execution of computer program instructions tangibly embodied on a computer readable memory in a serving gateway that identify, evaluate and control potential opportunities for D2D communication among two or more proximately located UE 400 is illustrated in accordance with the present invention. In a first step, the S-GW receives information pertaining to a source user equipment from at least one packet data network gateway (410), and in a second step, in response to receiving information pertaining to the source user equipment from the at least one packet data network gateway, an identification of the target user equipment and identification information of the source user equipment are sent to a target mobility management entity (420).

In an embodiment, the method and execution of computer instruction further includes the steps of, in response to receiving the information pertaining to the source user equipment from the at least one packet data network gateway, triggering a downlink data notification for the target device. In yet another embodiment the method and execution of computer instruction further includes the steps of implementing the identification information of the source user equipment into the downlink data notification of the target user equipment. In embodiments, the target user equipment is in an evolved packet system connection management idle mode or in an evolved packet system connection management connected mode. In another embodiment, the serving gateway identifies if the target mobility management entity is the source mobility management entity. In yet another embodiment, a serving gateway sends an evolved packet system bearer identifier of the source user equipment associated with the corresponding Internet protocol data flows to the target mobility management entity.

The above embodiments include allow controlling of a UE's access to one or more proximity-based packet switched applications or services by a core network. For example, a charging system such as an online charging system or off line charging system can be employed in accordance with a policy charging rule function to charge users for accessing various IP services.

Non-limiting examples of proximity-based packet switched applications or services could include; (i) proximity-based IP applications and/or services related to social applications, such as (a) exchanging files, photos, or text messages, (b) voice over LTE (LTEVoIP) conversation, (c) one-way streaming video, and (d) two-way video conferences; (ii) proximity-based IP applications and/or services related to local advertising; (iii) proximity-based IP applications and/or services related to multiplayer gaming such as (a) high resolution media (voice & video) exchanged interactively either with all participants or team members within a game environment; and (b) gaming adapted for providing control inputs based upon expected data to be received by all game participants with an ability to maintain causality; (v) proximity-based IP applications and/or services related to network offloading of traffic which could provide an opportunistic proximity offload when such a potential exists. For example, Device 1 initiates a transfer of the media flow from the macro network to a proximity communications session with Device 2. Such an off loading of network traffic could conserve macro network resources while maintaining the quality of user experience for the media session; (iv) proximity-based IP applications and/or services related to smart meters which includes monitoring communication among low capability machine-type-communication (MTC) devices, vehicular communication (safety and non-safety) or general machine to machine (M2M) communication among capability different devices or machines; and (vi) proximity-based IP applications and/or services related to public safety for both network controlled D2D and ad hoc D2D with partial or without network coverage as envisioned by First Responder Network Authority (FirstNet).

Figure 5:
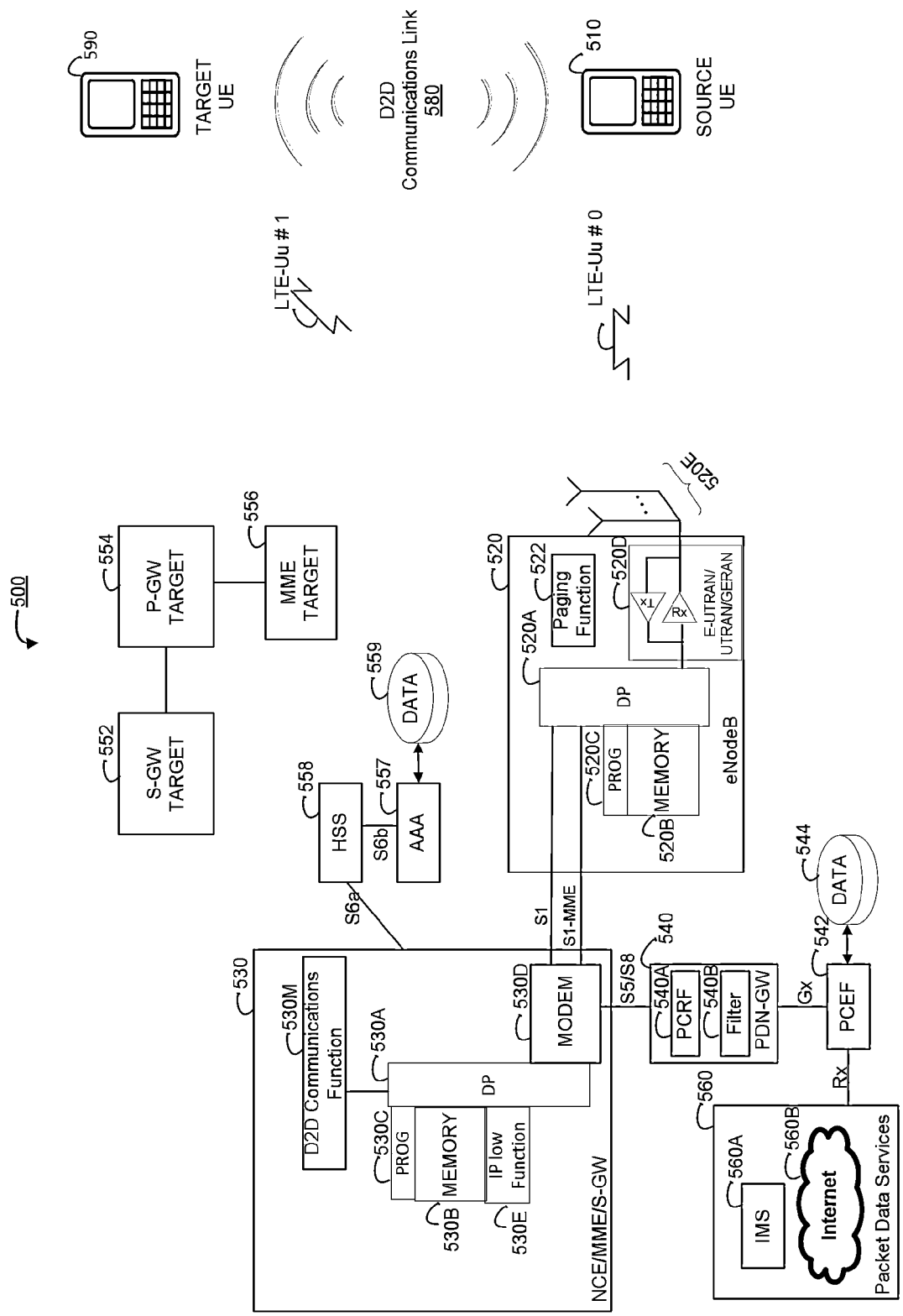
FIG. 5 is a simplified block diagram of various electronic devices and apparatuses that are suitable for use in practicing embodiments of the present invention.

Reference is now made to FIG. 5, which shows an example of a simplified block diagram of various electronic devices and apparatuses that are suitable for use in practicing embodiments of this invention. In FIG. 5, a first access node 520 is adapted for communication over a wireless link LTE-Uu #0 with a source mobile apparatus, such as a source mobile terminal or source user equipment UE 510. In additional embodiments of this invention UE 510 is adapted for device to device communication over a D2D communication link 580 with a proximity-located UE such as target UE 590. Source UE 510 and/or target UE 590 may comprise a mobile phone, smart phone, laptop computer or tablet computer or the like. The first access node 520 may be a legacy access point, such as a base station terminal (BTS), a Node B, a macro eNB, a WLAN AP, a femto eNB, or other type of base station (BS) or access point (AP) suitable for supporting E-UTRAN.

The first access node 520 includes a processing system and/or processor, such as at least one data processor (DP) 520A, and a storing device, such as at least one computer-readable memory (MEMORY) 520B, which stores at least one computer program (PROG) 520C. The first access node 520 also includes a communicating means, such as a long term evolution/long term evolution advanced (LTE/LTE-A) transceiver 520D, which includes a transmitter TX and a receiver RX for bidirectional wireless communications with the UE 510 via one or more antennas 520E. The LTE/LTE-A transceiver 520D can be any other transceiver capable of communicating with a universal mobile telecommunications system, an evolved universal mobile telecommunications Terrestrial Radio Access Network (E-UTRAN), a Global System for Mobile communications (GSM), a Universal Terrestrial Radio Access network (UTRAN), or cellular networks employing Wideband Code Division Multiple Access (WCDMA) or High Speed Packet Access (HSPA). First access node 520 also includes at least one of the PROGs 520C to carry out the above described methods and computer program operations in accordance with one or more embodiments of the present invention. For example, a Paging function 522 is included in first access node adapted to convey information to source UE 510 regarding D2D communications. Also as shown in FIG. 5 are data interfaces S1 and control interface S1-MEE which are coupled to the first access node 520 with network core element/mobility management entity/service gateway NCE/MME/S-GW 530.

FIG. 5 also includes a target serving gateway (S-GW) 552, a target packet data network gateway (P-GW) 554 and a target mobility management entity (MME) 556 which are coupled to target user equipment 590 which is camped on first access node 520 over wireless link LTE-Uu #1. In the scenario shown in FIG. 5, target MME 556 might actually be the same MME employed by source UE 510. However it is possible that the ECGI of the source UE 510 indicated by the P-GW is not in the S-GW's context, as such S-GW will indicate the ECGI stored in its context of source UE 510 to target MME 556 (e.g., since the S-GW always has the latest information about the device's ECGI value). For example, both target UE 590 and source UE 510 might both be camped on different eNBs. However, each eNB might be coupled to one or more MMEs in a MME pool (not shown). In other words, both eNBs share one or more of the same MME in the MME pool.

NCE/MME/S-GW 530 includes a processing system/or processor (such as at least one data processor (DP) 530A), a storing device, (such as at least one computer-readable memory (MEMORY) 530B which stores at least one computer program (PROG) 530C, and a communicating device, such as a modem 530D for bidirectional communication with the first access node 520 via the links S1 and S1-MME. In addition, the NCE/MME/S-GW 530 is coupled to a packet data network gateway (P-GW) 540 via interfaces S5/S8. As shown in NCE/MME/S-GW 530 an IP flow Function 530E configured for carrying out identifying the source and destination addresses of a certain IP flow to determine if the IP flow is within a certain network in accordance with one or more of the above embodiments of the present invention. A target device's identification can be stored in target P-GW 554 which includes target UE 590 international mobile subscriber identifier (IMSI), mobile station integrated services digital network (MSISDN) ID, mobile equipment (ME) identifier, and the like. NCE/MME/S-GW 530 also includes a D2D communication function 530M configured for carrying out one or more of the above embodiments of the present invention, such as sending specific identifying information pertaining to target UE 590, together with that device's E-UTRAN cell global identifier ECGI value to a source MME. Also included is a D2D communication function which includes various methods of determining whether to allow D2D communications.

P-GW 540 includes a PCRF 540A, as described above, in furtherance of the above described embodiments of the present invention. Also, P-GW 540 includes an IP filter 540B for determining the IP flow required for data services. P-GW 540 is coupled to PCEF 542 via logical reference point Gx. As shown in FIG. 5, PCEF 542 is coupled to packet data services 560. Packet data services 560 include IMS 560A and the Internet 560B as non-limiting examples of such services.

Also shown in FIG. 5 is a home subscriber server (HSS) 558 which enables the transfer of subscription and authentication data via the S6a interface for authenticating and/or authorizing user access to the evolved system which is obtained via a S6b interface from the authentication authorization accounting (AAA) server 557. The HSS 558 obtains data 559 which includes various subscriptions relevant data pertaining to users, such as international mobile subscriber identifier (IMSI), mobile station integrated services digital network (MSISDN), subscribed access point names (APN) and subscribed QoSe and so on.

In these regards, embodiments of this invention may be implemented at least in part by computer software stored on the MEM 530B and MEMORY 520B which is executable by the DP 520A, DP 530C of the access node 520 or NCE/MME/S-GW 530 and/or UE 510, or by hardware, or by a combination of tangibly stored software and hardware (and tangibly stored firmware). Electronic devices implementing these aspects of the invention need not be the entire devices as depicted in FIG. 7, but embodiments may be implemented by one or more components of same, such as the above-described tangibly stored software, hardware, firmware and DP, or a system on a chip (SOC) or an application specific integrated circuit (ASIC).

Various embodiments of the computer readable MEMs 520B and 530B include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the DPs 520A and 530A include, but are not limited to, general purpose computers, special purpose computers, microprocessors, digital signal processors (DSPs) and multi-core processors.

As used in this application, the term 'circuitry' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of the term in this application, including in any claims. As a further example, as used in this application, the term "circuitry" would also cover an implementation of merely a processor (or multiple processors) or portion of a processor and its (or their) accompanying software and/or firmware. The term "circuitry" also would cover, if applicable to the particular claim element, a baseband integrated circuit or applications processor integrated circuit for a mobile phone or a similar integrated circuit in server, a cellular network device, or other network device.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. A method for use in device to device communication among two or more user equipment, the method comprising:
   determining, by circuitry of a packet data network gateway, if a source and destination address of one or more Internet protocol data flows are within a specific network in an evolved packet system;
   in response to determining that one or more Internet protocol data flows are within the specific network, determining, by the circuitry of the packet data network gateway, if the source user equipment and a target user equipment are authenticated for device to device communication; and
   in response to determining that the source user equipment and the target user equipment are authenticated for device to device communication, sending, by the packet data network gateway, identification information of a source user equipment to a target serving gateway corresponding to the target user equipment for triggering a downlink data notification for the target user equipment.

2. The method according to claim 1, further comprising determining if the target serving gateway is a source serving gateway.

3. The method according to claim 1, wherein the source user equipment identification information comprises at least one of:
   an international mobile subscriber identifier;
   a mobile station integrated services digital network identifier; and
   a mobile equipment identifier.

4. The method according to claim 1, further comprising sending an evolved packet system bearer identifier associated with one or more corresponding Internet protocol data flows or an evolved universal telecommunications access network cell global identifier of a source device to the target serving gateway.

5. The method according to claim 1, wherein the target serving gateway sends at least of the source user equipment identification information to a target mobility management entity.

6. The method according to claim 1, wherein the target serving and source gateways operate according to long term evolution or according to long term evolution advanced.

7. A packet data network gateway apparatus for use in device to device communication among two or more user equipment, the packet data network gateway apparatus comprising:
   at least one memory storing at least one computer program; and
   circuitry configured, when executing at least one computer program, to
      determine if a source and destination address of one or more Internet protocol data flows are within a specific network in an evolved packet system;
      in response to determining that one or more Internet protocol data flows are within the specific network, determine if the source user equipment and a target user equipment are authenticated for device to device communication; and
      in response to determining that the source user equipment and the target user equipment are authenticated for device to device communication, send identification information of a source user equipment to a target serving gateway corresponding to the target user equipment for triggering a downlink data notification for the target user equipment.

8. The packet data network gateway apparatus according to claim 7, wherein the source user equipment identification information comprises at least one of:
   an international mobile subscriber identifier;
   a mobile station integrated services digital network identifier; and
   a mobility management entity identifier.

9. A method, implemented by a target serving gateway corresponding to a target user equipment for use in device to device communication among two or more user equipment, the method comprising:
   receiving, by circuitry of the target serving gateway, information pertaining to a source user equipment from at least one packet data network gateway after the packet data network gateway determines that that one or more Internet protocol data flows are within a specific network and the source user equipment and a target user equipment are authenticated for device to device communication; and
   in response to receiving information pertaining to the source user equipment from the at least one packet data network gateway, sending identification information of a target user equipment and identification information of the source user equipment to a target mobility management entity and triggering a downlink data notification for the target user equipment.

10. The method according to claim 9, further comprising implementing the identification information of the source user equipment into the downlink data notification of the target user equipment.

11. The method according to claim 9, wherein the target user equipment is in an evolved packet system connection management idle mode or in an evolved packet system connection management connection mode.

12. The method according to claim 9, wherein the target serving gateway identifies if the target mobility management entity is the source mobility management entity.

13. The method according to claim 9, wherein the target serving gateway sends an evolved packet system bearer identifier of the source user equipment associated with one or more corresponding Internet protocol data flows to the target mobility management entity.

14. The method according to claim 9, wherein the target serving target serving gateway operates according to the long term evolution or according to long term evolution advanced.

15. A target serving gateway apparatus corresponding to a target user equipment for use in device to device communication among two or more user equipment, the target serving gateway apparatus comprising:
   at least one memory storing at least one computer program; and
   circuitry configured, when executing the at least one computer program, to
      receive information pertaining to a source user equipment from at least one packet data network gateway after the packet data network gateway determines that that one or more Internet protocol data flows are wiihin a specific network and the source user equipment and a target user equipment are authenticated for device to device communication; and
      in response to receiving information pertaining to the source user equipment from the at least one packet data network gateway, send identification information of a target user equipment and identification information of the source user equipment to a target mobility management entity and trigger a downlink data notification for the target user equipment.

16. The target serving gateway apparatus according to claim 15, wherein the circuitry is configured to further cause the apparatus to at least implement the identification information of the source user equipment into the downlink data notification of the target user equipment.

\* \* \* \* \*